(12) United States Patent
Weiss et al.

(10) Patent No.: US 9,510,152 B2
(45) Date of Patent: Nov. 29, 2016

(54) SYSTEM AND METHOD FOR SCHEDULING LOCATION MEASUREMENTS

(71) Applicant: WaveMarket, Inc., Emeryville, CA (US)

(72) Inventors: Andrew Weiss, San Ramon, CA (US); Scott Hotes, Berkeley, CA (US)

(73) Assignee: Location Labs, Inc., Emeryville, CA (US)

( * ) Notice: Subject to any disclaimer, the term of this patent is extended or adjusted under 35 U.S.C. 154(b) by 131 days.

(21) Appl. No.: 14/250,777

(22) Filed: Apr. 11, 2014

(65) Prior Publication Data

US 2015/0296343 A1 Oct. 15, 2015

(51) Int. Cl.
H04M 11/04 (2006.01)
H04W 24/00 (2009.01)
H04W 4/02 (2009.01)

(52) U.S. Cl.
CPC ..................................... *H04W 4/027* (2013.01)

(58) Field of Classification Search
CPC ................................. H04W 4/22; H04W 4/02
USPC ............. 455/404.2, 414.2, 456.1–456.6, 457
See application file for complete search history.

(56) References Cited

U.S. PATENT DOCUMENTS

| | | |
|---|---|---|
| 5,223,844 A | 6/1993 | Mansell et al. |
| 5,278,539 A | 1/1994 | Lauterbach et al. |
| 5,604,787 A | 2/1997 | Kotzin et al. |
| 5,628,050 A | 5/1997 | McGraw et al. |
| 5,724,243 A | 3/1998 | Westerlage et al. |
| 5,732,383 A | 3/1998 | Foladare et al. |
| 5,815,802 A | 9/1998 | Loechner, II |
| 5,907,293 A | 5/1999 | Tognazzini |
| 5,948,040 A | 9/1999 | Delorme et al. |
| 5,959,577 A | 9/1999 | Fan et al. |

(Continued)

FOREIGN PATENT DOCUMENTS

| | | |
|---|---|---|
| EP | 0781067 | 6/1997 |
| EP | 1081974 | 3/2001 |

(Continued)

OTHER PUBLICATIONS

International Search Report dated Nov. 3, 2011 for PCTAU02011001038.

(Continued)

*Primary Examiner* — Dung Hong
(74) *Attorney, Agent, or Firm* — Dova Law, P.C.

(57) ABSTRACT

System and method for determining when to initiate radio signal measurements to determine mobile device location. The method includes determining a plurality of locations of one or more mobile devices based on radio signal measurements. Acceleration of the one or more mobile devices between the plurality of locations is determined based on sensor measurements. A first location of a particular mobile device is determined and acceleration is measured by the particular mobile device. It is determined when to initiate radio signal measurements by the particular mobile device to determine a second location of the particular mobile device based on the measured acceleration of the particular mobile device, the determined plurality of locations of the one or more mobile devices, and the determined acceleration of the one or more mobile devices. Radio signal measurements are initiated by the particular mobile device to determine the second location of the particular mobile device.

37 Claims, 5 Drawing Sheets

(56) References Cited

U.S. PATENT DOCUMENTS

| | | | |
|---|---|---|---|
| 5,959,945 A | 9/1999 | Kleiman | |
| 6,031,455 A | 2/2000 | Grube et al. | |
| 6,052,574 A | 4/2000 | Smith | |
| 6,052,598 A | 4/2000 | Agrawal et al. | |
| 6,091,956 A | 7/2000 | Hollenberg | |
| 6,115,611 A | 9/2000 | Kimoto et al. | |
| 6,134,454 A | 10/2000 | Foladare et al. | |
| 6,236,933 B1 | 5/2001 | Lang | |
| 6,240,284 B1 | 5/2001 | Bugnon et al. | |
| 6,256,577 B1 | 7/2001 | Graunke | |
| 6,278,375 B1 | 8/2001 | Hucker | |
| 6,351,221 B1 | 2/2002 | Phillips et al. | |
| 6,381,465 B1 | 4/2002 | Chern et al. | |
| 6,400,956 B1 | 6/2002 | Richton | |
| 6,480,783 B1* | 11/2002 | Myr | G01C 21/3492 340/990 |
| 6,501,947 B1 | 12/2002 | Hunzinger et al. | |
| 6,519,465 B2 | 2/2003 | Stilp et al. | |
| 6,615,130 B2 | 9/2003 | Myr | |
| 6,631,267 B1 | 10/2003 | Clarkson et al. | |
| 6,647,257 B2 | 11/2003 | Owensby | |
| 6,647,269 B2 | 11/2003 | Hendrey et al. | |
| 6,690,940 B1 | 2/2004 | Brown et al. | |
| 6,731,238 B2 | 5/2004 | Johnson | |
| 6,731,940 B1 | 5/2004 | Nagendran | |
| 6,745,021 B1 | 6/2004 | Stevens | |
| 6,772,213 B2 | 8/2004 | Glorikian | |
| 6,795,710 B1 | 9/2004 | Creemer | |
| 6,834,195 B2 | 12/2004 | Brandenberg et al. | |
| 6,914,525 B2 | 7/2005 | Rao et al. | |
| 6,941,126 B1 | 9/2005 | Jordan, Jr. | |
| 6,947,835 B2 | 9/2005 | Kaplan et al. | |
| 7,039,387 B2 | 5/2006 | Macolly et al. | |
| 7,046,962 B1 | 5/2006 | Belcea | |
| 7,054,612 B2 | 5/2006 | Patel | |
| 7,096,115 B1 | 8/2006 | Groth et al. | |
| 7,106,843 B1 | 9/2006 | Gainsboro et al. | |
| 7,123,926 B2 | 10/2006 | Himmelstein | |
| 7,184,744 B1 | 2/2007 | Schnabel | |
| 7,194,249 B2 | 3/2007 | Phillips et al. | |
| 7,202,814 B2 | 4/2007 | Caspi et al. | |
| 7,260,378 B2 | 8/2007 | Holland et al. | |
| 7,301,450 B2 | 11/2007 | Carrino | |
| 7,313,383 B2 | 12/2007 | Fuji | |
| 7,463,890 B2 | 12/2008 | Herz et al. | |
| 7,525,484 B2 | 4/2009 | Dupray et al. | |
| 7,643,834 B2 | 1/2010 | Ioppe et al. | |
| 7,653,218 B1 | 1/2010 | Maltz et al. | |
| 7,688,731 B2 | 3/2010 | Haumont et al. | |
| 7,705,726 B2 | 4/2010 | Graves et al. | |
| 7,764,946 B1 | 7/2010 | Sennett et al. | |
| 7,805,131 B2 | 9/2010 | Cholkar et al. | |
| 7,813,326 B1 | 10/2010 | Kelm et al. | |
| 7,864,073 B2 | 1/2011 | Lee et al. | |
| 7,876,704 B1 | 1/2011 | Bims et al. | |
| 7,941,161 B2 | 5/2011 | Ioppe et al. | |
| 7,941,162 B2 | 5/2011 | Ioppe et al. | |
| 7,957,355 B1 | 6/2011 | Helfering et al. | |
| 8,010,102 B2 | 8/2011 | Glick et al. | |
| 8,060,017 B2 | 11/2011 | Schlicht et al. | |
| 8,095,175 B2 | 1/2012 | Todd et al. | |
| 8,107,432 B2 | 1/2012 | Seo | |
| 8,200,248 B2 | 6/2012 | Ioppe et al. | |
| 8,204,514 B2 | 6/2012 | Ioppe et al. | |
| 8,249,627 B2 | 8/2012 | Olincy et al. | |
| 8,255,393 B1 | 8/2012 | Yu et al. | |
| 8,315,597 B2 | 11/2012 | Olincy et al. | |
| 8,351,408 B2 | 1/2013 | Daigle | |
| 8,369,838 B2 | 2/2013 | Mallavarapu et al. | |
| 8,503,994 B1 | 8/2013 | Sanjeev | |
| 8,594,065 B2 | 11/2013 | Polito et al. | |
| 8,606,302 B2 | 12/2013 | Ioppe et al. | |
| 8,725,174 B2 | 5/2014 | Grossman et al. | |
| 8,750,243 B2 | 6/2014 | Aghvami et al. | |
| 8,768,286 B2 | 7/2014 | Naboulsi | |
| 2001/0022558 A1 | 9/2001 | Karr, Jr. et al. | |
| 2001/0029425 A1 | 10/2001 | Myr | |
| 2001/0044310 A1 | 11/2001 | Lincke | |
| 2002/0128768 A1 | 9/2002 | Nakano et al. | |
| 2003/0016770 A1 | 1/2003 | Trans et al. | |
| 2003/0078055 A1 | 4/2003 | Smith et al. | |
| 2003/0086515 A1 | 5/2003 | Trans et al. | |
| 2003/0104821 A1* | 6/2003 | Gerner | B60R 25/102 455/456.1 |
| 2003/0156543 A1 | 8/2003 | Sahinoglu et al. | |
| 2003/0216138 A1 | 11/2003 | Higuchi et al. | |
| 2004/0064565 A1 | 4/2004 | Batra et al. | |
| 2004/0146007 A1 | 7/2004 | Saadawi et al. | |
| 2005/0122259 A1 | 6/2005 | Sairo et al. | |
| 2006/0025158 A1 | 2/2006 | Leblanc et al. | |
| 2006/0050820 A1 | 3/2006 | Kawada et al. | |
| 2006/0058036 A1 | 3/2006 | Watanabe et al. | |
| 2006/0079245 A1 | 4/2006 | Moed | |
| 2006/0089136 A1 | 4/2006 | Rajkotia | |
| 2006/0111089 A1 | 5/2006 | Winter et al. | |
| 2006/0223494 A1 | 10/2006 | Chmaytelli et al. | |
| 2006/0253526 A1 | 11/2006 | Welch et al. | |
| 2007/0072583 A1 | 3/2007 | Barbeau et al. | |
| 2007/0149214 A1 | 6/2007 | Walsh et al. | |
| 2007/0189154 A1 | 8/2007 | Hourtane et al. | |
| 2007/0270132 A1 | 11/2007 | Poosala | |
| 2007/0293240 A1 | 12/2007 | Drennan | |
| 2008/0169920 A1 | 7/2008 | Spencer | |
| 2008/0242373 A1 | 10/2008 | Lu et al. | |
| 2009/0002147 A1 | 1/2009 | Bloebaum et al. | |
| 2009/0067324 A1 | 3/2009 | Licardie et al. | |
| 2009/0156161 A1 | 6/2009 | Strahs | |
| 2009/0175238 A1 | 7/2009 | Jetcheva et al. | |
| 2009/0245118 A1 | 10/2009 | McCormick | |
| 2010/0120429 A1 | 5/2010 | Kazmi et al. | |
| 2010/0190513 A1 | 7/2010 | Andreasson | |
| 2010/0210254 A1 | 8/2010 | Kelly et al. | |
| 2010/0272268 A1 | 10/2010 | Sambhwani et al. | |
| 2010/0279626 A1 | 11/2010 | Bradley et al. | |
| 2010/0285815 A1 | 11/2010 | Treu et al. | |
| 2010/0291950 A1 | 11/2010 | Lin et al. | |
| 2010/0323659 A1 | 12/2010 | Wehling | |
| 2011/0034183 A1 | 2/2011 | Haag et al. | |
| 2011/0093161 A1 | 4/2011 | Zhou et al. | |
| 2011/0117878 A1 | 5/2011 | Barash et al. | |
| 2011/0151830 A1 | 6/2011 | Blanda et al. | |
| 2011/0164527 A1 | 7/2011 | Mishra et al. | |
| 2011/0228753 A1* | 9/2011 | Polito | G01S 5/0221 370/338 |
| 2011/0230201 A1 | 9/2011 | Hotes et al. | |
| 2011/0250871 A1 | 10/2011 | Huang et al. | |
| 2011/0257883 A1 | 10/2011 | Kuznetsov | |
| 2011/0267981 A1 | 11/2011 | Davies | |
| 2011/0268022 A1 | 11/2011 | Xu | |
| 2011/0275321 A1 | 11/2011 | Zhou et al. | |
| 2011/0294520 A1 | 12/2011 | Zhou et al. | |
| 2012/0001548 A1 | 1/2012 | Recker et al. | |
| 2012/0009890 A1 | 1/2012 | Curcio et al. | |
| 2012/0081500 A1 | 4/2012 | Border et al. | |
| 2012/0083287 A1 | 4/2012 | Casto et al. | |
| 2012/0100866 A1 | 4/2012 | Grossman et al. | |
| 2012/0158422 A1* | 6/2012 | Burnham | G06Q 10/00 705/2 |
| 2012/0188163 A1 | 7/2012 | Xiao | |
| 2012/0223861 A1* | 9/2012 | Kupfer | G01S 19/48 342/357.74 |
| 2012/0243460 A1 | 9/2012 | Muto et al. | |
| 2012/0244883 A1 | 9/2012 | Tibbits et al. | |
| 2012/0289252 A1 | 11/2012 | Hotes et al. | |
| 2012/0295622 A1 | 11/2012 | Kazmi et al. | |
| 2012/0315880 A1 | 12/2012 | Peitrow et al. | |
| 2013/0084847 A1 | 4/2013 | Tibbitts et al. | |
| 2013/0158860 A1* | 6/2013 | Gum | G01C 21/265 701/410 |
| 2013/0211706 A1 | 8/2013 | Macnaughtan et al. | |
| 2013/0217331 A1 | 8/2013 | Manente | |
| 2013/0303106 A1 | 11/2013 | Martin | |
| 2013/0344891 A1 | 12/2013 | Hotes et al. | |
| 2014/0247126 A1 | 9/2014 | Grossman et al. | |

(56) References Cited

U.S. PATENT DOCUMENTS

2015/0065163 A1* 3/2015 Murakami ............ H04W 64/00
 455/456.1
2015/0087332 A1* 3/2015 Pijl ........................ G01S 19/34
 455/456.1
2016/0080909 A1 3/2016 Grossman et al.

FOREIGN PATENT DOCUMENTS

| IT | WO 2009080105 | 7/2009 |
| JP | 11346380 | 12/1999 |
| SE | WO 2010090558 | 8/2010 |

OTHER PUBLICATIONS

Digital cellular telecommunications system (Phase 2+) (GSM):Universal Mobile Telecommunications System (UMTS); Location Services (LCS); Service description, Stage 1 (3GPP TS 22.871 version 4.3.0 Release 4); ETSI TS 122 071 V4.3.0 (Mar. 2001) ETSI TS 122 071 V4.3.0, XX, XX, Apr. 25, 2001, pp. 1-41, XP002222160.

* cited by examiner

SYSTEM AND METHOD FOR SCHEDULING LOCATION MEASUREMENTS

BACKGROUND

Mobile communication devices such as smart phones generally include Global Positioning System (GPS) hardware and other systems for determining device location. Location requests from an application on a mobile communication device may require significant electric power from a location determining system on the device decreasing battery life and affecting the device usability. It would be desirable to minimize a number of location requests by an application to conserve device resources and battery power. However, less frequent location requests may have an undesirable effect on the user experience by requiring an application to use location data too old to provide proper functionality.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

Described are a system and methods for minimizing location requests on a mobile device such as GPS location requests. Location requests are minimized by predicting based on acceleration measurements when the device has moved sufficient distance to require a location measurement. If sufficient movement has not been predicted no location request is made to a mobile device's location determining system, thereby minimizing location requests.

A method is provided for determining when to initiate radio signal measurements to determine mobile device location. The method includes determining a plurality of locations of one or more mobile devices based on radio signal measurements. Acceleration of the one or more mobile devices between the plurality of locations is determined based on sensor measurements. A first location of a particular mobile device is determined and acceleration is measured by the particular mobile device. It is determined when to initiate radio signal measurements by the particular mobile device to determine a second location of the particular mobile device based on the measured acceleration of the particular mobile device, the determined plurality of locations of the one or more mobile devices, and the determined acceleration of the one or more mobile devices. Radio signal measurements are initiated by the particular mobile device to determine the second location of the particular mobile device.

Another method for determining when to initiate radio signal measurements to determine mobile device location is provided. The method includes determining a first location of a mobile device, measuring acceleration by the mobile device, and determining when to initiate radio signal measurements by the mobile device to determine a second location of the mobile device based at least on the measured acceleration of the mobile device. Radio signal measurements are initiated by the mobile device to determine the second location of the particular mobile device.

A mobile device is provided comprising at least one non-transitory computer readable storage medium having encoded thereon instructions that, when executed by one or more processors of the device, cause the device to perform a process comprising determining a first location of the mobile device and measuring acceleration by the mobile device. The process further includes determining when to initiate radio signal measurements by the mobile device to determine a second location of the mobile device based at least on the measured acceleration of the mobile device, and initiating radio signal measurements by the mobile device to determine the second location of the mobile device.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Embodiments of the invention are described below with reference to the drawing figures wherein like numerals represent like elements throughout.

Figure 1:
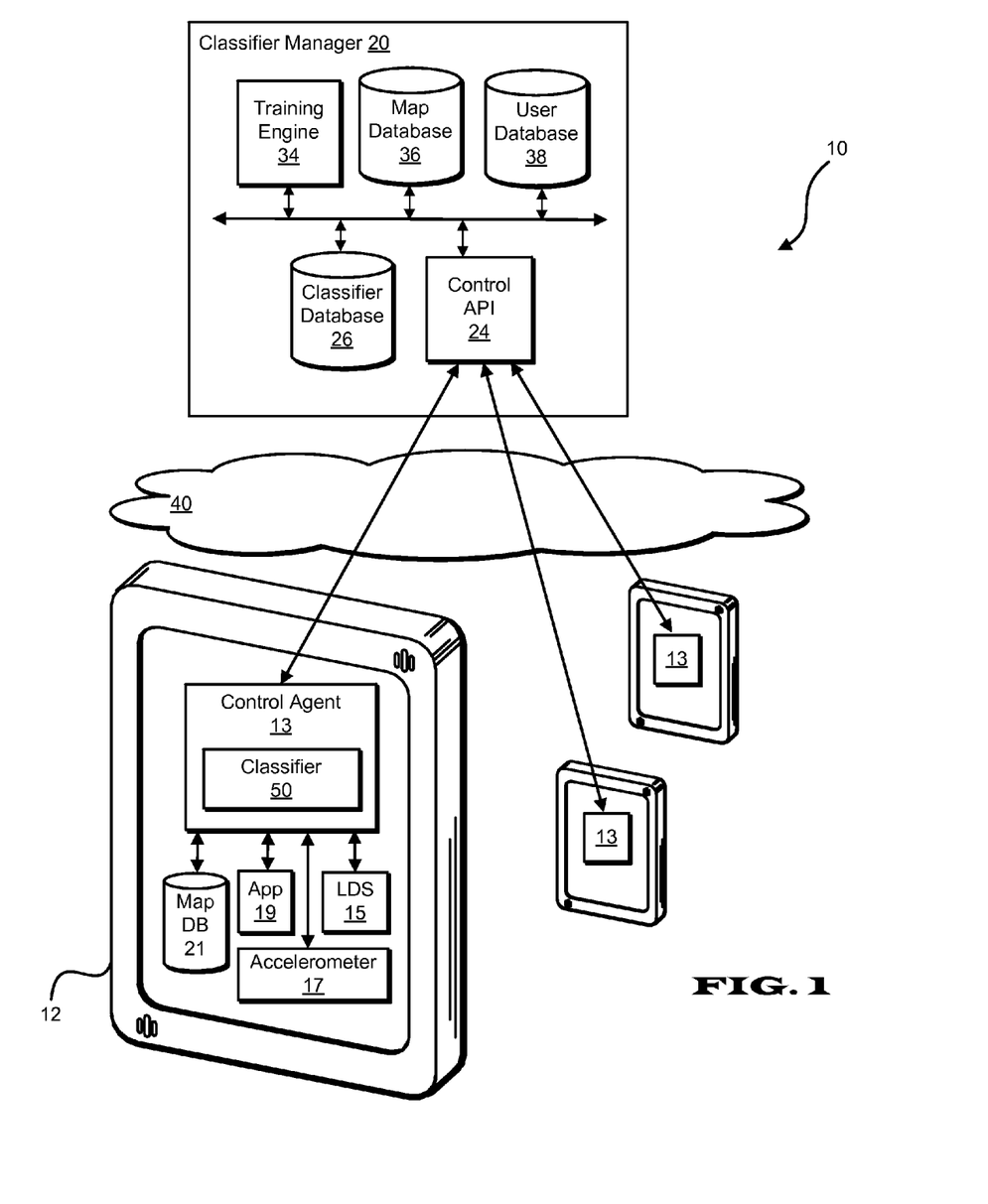
FIG. 1 is a diagram showing a system for training and applying motion classifiers to reduce location measurements by a mobile communication device.

Referring to FIG. 1, a system 10 is provided including a classifier manager 20 configured to aggregate and process data from mobile devices 12 to train classifiers used in predicting mobile device travel. The classifier manager 20 can function in a communications network 40, including one or more computer networks such as the Internet, phone networks, or other wired or wireless networks. The classifier manager 20 and its constituent elements are preferably implemented on one or more network connectable processor-enabled computing systems via hardware components, software components sharing one or more processing units, or a combination hardware and software components. The classifier manager 20 need not be implemented on a single system at a single location, but can be decentralized for example in a peer-to-peer configuration operating on two or more of the mobile communication devices 12 ("mobile devices 12").

The mobile devices 12 can include for example a smartphone or other cellular enabled mobile device preferably configured to operate on a wireless telecommunication network via suitable hardware and software components. In addition to components enabling wireless communication, the mobile device 12 has one or more location determination systems (LDS) 15, including for example global positioning system (GPS) hardware or hardware used for cell tower triangulation, such that accurate location of the mobile device 12 can be derived. An accelerometer 17 is provided from which a monitoring/control agent 13 ("control agent 13") gathers data used for predicting distance traveled by the mobile device 12. The mobile device 12 can include additional sensors such as a proximity sensor, luxmeter, magnetometer, and gyroscope.

The classifier manager 20 enables a control application program interface ("API") 24, a classifier database 26, a training engine 34, a mapping database 36, and a user database 38. The classifier manager 20 can be implemented on one or more network connectable computing systems in communication via the communications network 40 with mobile devices 12 which execute the control agent 13. Alternatively, the classifier manager 20 or one or more components thereof can be executed on a mobile device 12 or other system or a plurality of systems.

Software and/or hardware residing on a mobile device 12 enables the control agent 13 to control requests for location to the LDS 15 from an application or system based at least on acceleration data from the accelerometer 17. The control agent 13 can take as input accelerometer readings from the accelerometer 17 and derive velocity over a particular time interval, for example 1 second, through application of a motion classifier 50. If an earlier determined location from the LDS 15 exists, and if between the time corresponding to that location determination and a current time it is determined through periodic motion classification assessments by applying the mobile device motion classifier 50 that the net movement of the mobile device 12 is small enough, then it is not necessary to make a subsequent location request, and the earlier determined location is considered still valid. If the determined net movement exceeds a particular threshold a new location request to the LDS 15 is triggered. Classifying acceleration measurements can be used in conjunction with other such methods, for example detecting changes in what wireless base stations are closest to the mobile device 12, which may be indicative of a substantive change in location, to determine if a location request is required.

A motion classifier classification result denotes an approximate velocity of the mobile device 12 at the time period over which readings from the accelerometer 17 were gathered. This result can be an approximation of the actual velocity, for example 0 miles/hour (stationary), 7 miles/hour, or 34 miles/hour. The classification result can also include a confidence level, reflecting the accuracy of the result. Alternatively, the classification result can specify a range say 0-5 miles/hour or 10-20 miles/hour, wherein there is a supposition that there is a high likelihood that the directed velocity is within the range of the result.

A motion classifier 50 can be trained by the classifier manager 20 via the training engine 34. Data for training the motion classifier 50 can be received from a mobile device 12 through the control API 24 via the control agent 13 or other suitable source. Alternatively, the motion classifier 50 can be trained by the control agent 13 on the mobile device 12.

Figure 2:
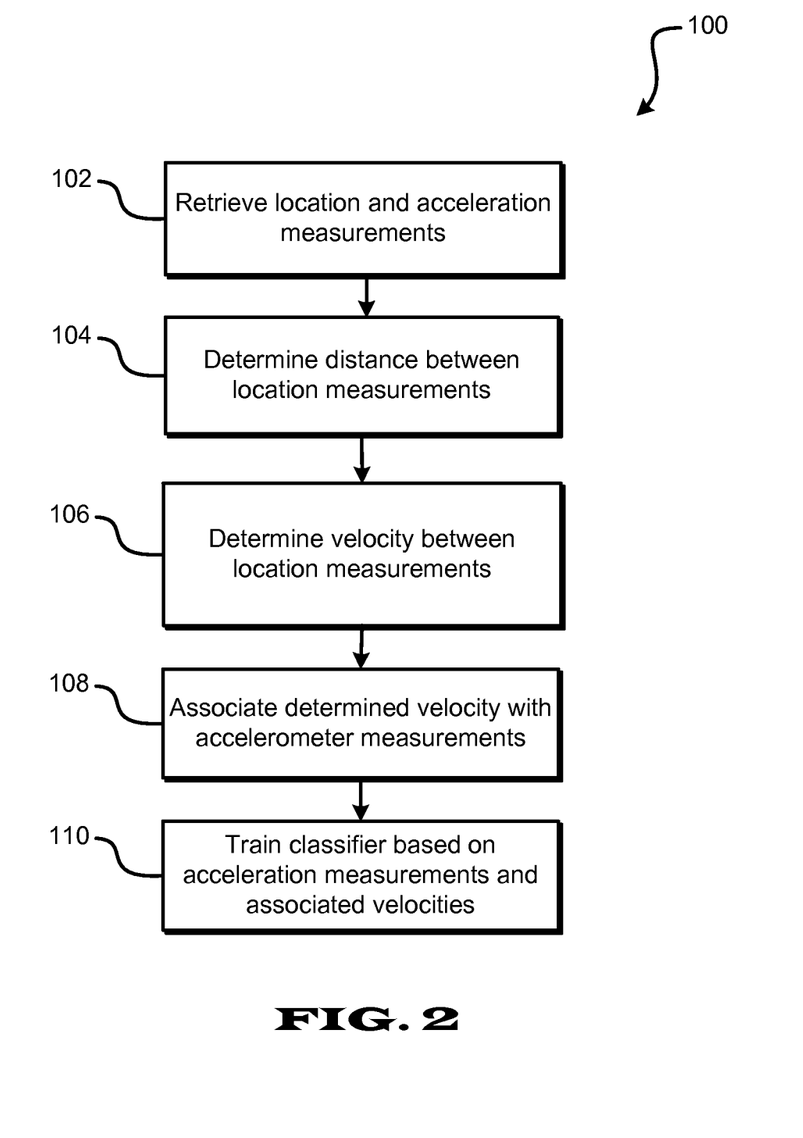
FIG. 2 is a flowchart showing a method for training a motion classifier.

Referring to FIG. 2, a method 100 for training a classifier is described. In a step 102 data is retrieved including geographic location measurements and accelerometer measurements corresponding to a mobile device 12 from the accelerometer 17. The accelerometer measurements are partitioned into time intervals ("accelerometer time intervals") and a location measurement corresponds to each partition, for example at the beginning of adjacent partitions. The distance between measured geographic locations of adjacent partitions are determined (step 104), and the average velocity between each geographic location is determined by dividing the distance between geographic locations of adjacent partitions by the corresponding accelerometer interval between the geographic locations (step 106). The determined distance can be a straight line distance or a distance following a path for example based on map data stored in the map database 36. Each acceleration measurement is associated with the determined average velocity corresponding to its accelerometer time interval (108). The collection of accelerometer readings and associated velocities are saved to a file or set of files and a motion classifier is trained on the files containing the accelerometer reading partitions and their associated velocities (step 110). As indicated above, the training of the motion classifier can be performed by a network connectable computing system remote from the mobile device 12 where the data is collected, or locally by a processor on the mobile device 12.

An example motion classifier includes a decision tree trained on a vertical mean, vertical standard deviation, horizontal mean, or horizontal standard deviation derived from the accelerometer readings. A Hidden Markov Model ("HMM") can be used to post-process the decision tree output, to increase the predictive validity of the motion classifier classification results.

Measured geographic locations (e.g., GPS determined locations) can be used to condition classifier results. For example, if a large number of GPS samples correspond to substantially the same particular geographic location over a period of time, and it is the case that actual velocity at the particular geographic location (e.g., an office building) is typically slow, then classifier results can be conditioned to correspond to a decreased likelihood that motion has occurred.

Map data from the mapping database 36 or the mobile device 12 used in training can also be used to condition the results of a classifier 50. For example, if the GPS readings used in the training data for the classifier are correlated with map data, it can be determined that a GPS reading corresponds to a location on a road, which can bias classifier results to be more likely that the GPS location has changed, or it can be determined that a GPS reading corresponds to a shopping mall, which can bias classifier results to be less likely that GPS location has changed. Road history can be maintained in the mapping database 36 with respect to traffic conditions occurring at time of day, day of week, or day of year to further condition the likelihood of the degree of relative motion that has occurred. The increased accuracy of classifier predictions due to the consideration of the map and date/time data are incorporated into the resulting classifier model.

Figure 3:
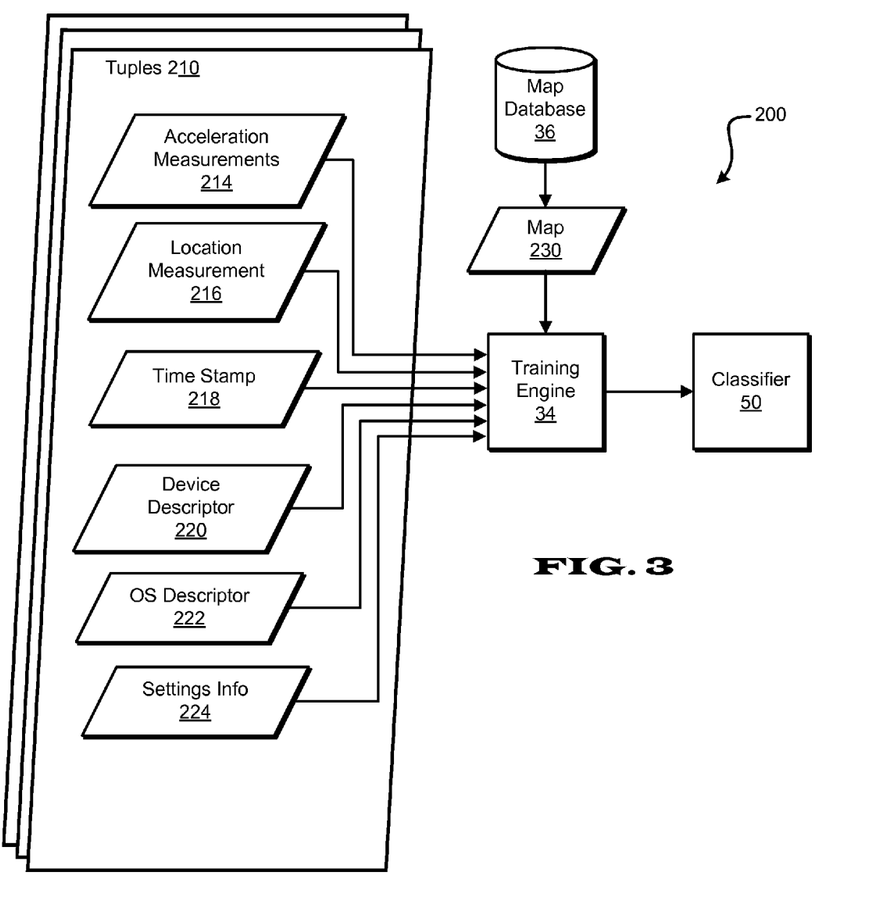
FIG. 3 is a process diagram showing inputs to and output from a motion classifier training engine.

Referring to FIG. 3, a classifier training or retraining process diagram 400 showing example inputs to and output from the training engine 34 is shown. A plurality of tuples are received from one or more mobile devices 12. A tuple 210 received from a mobile device 12 via the control agent 13 includes a partition of acceleration measurements 314, location measurement 316, time stamp 318, device descriptor 320 such as device model number and serial number, mobile device operating system descriptor 322, and mobile device settings information 324, which data are input into the classifier training engine 34. Further, map data 230 gathered from the map database 36 or alternatively from the mobile device 12 via the map database 21 can be input to the training engine 34 to account for geographic features in generating results. The training engine 34 outputs a trained or retrained motion classifier 50.

Figure 5:
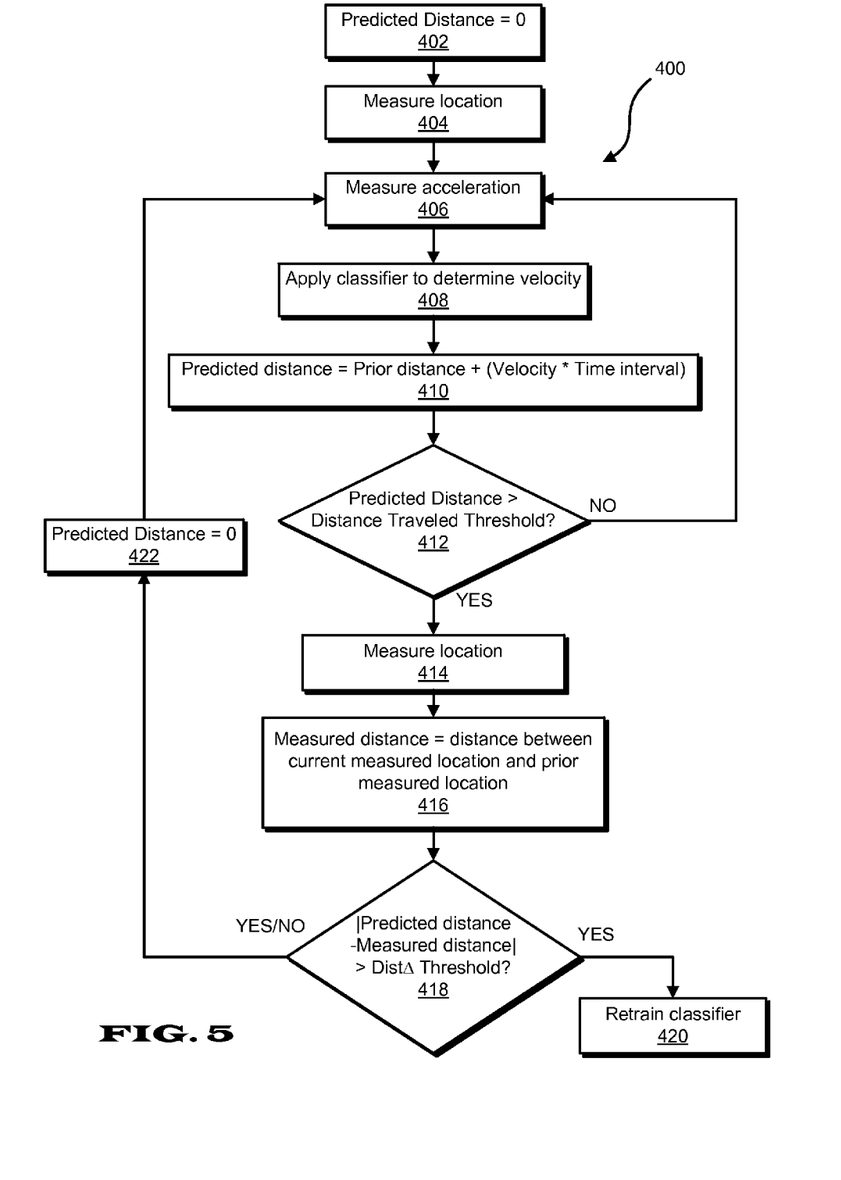
FIG. 5 is a flowchart showing a method of implementing a motion classifier to minimize location requests

The control agent 13 can download a trained classifier 50 from the classifier manager 20 via the control API 24 and install the classifier 50 on the mobile device 12. Referring to FIG. 5, a method 400 of implementing the motion classifier 50 to minimize location requests is shown, for example GPS location requests from an application ("app") 19 executed on the mobile device 12. The method 400 is described as performed on the mobile device 12 by the control agent 13 via one or more processing units for a period of time during which location of the mobile device 12 is required. Alternatively, one or more steps of the method 400 can be performed remote from the mobile device 12, for example on a network connectable computing system implementing the classifier manager 20 or other suitable system.

In a step 402, a variable representing a predicted distance traveled between location measurements ("locates") is set to zero (0). In a step 404 a locate is performed by the LDS 15 (e.g., a GPS locate), for example at the direction of the control agent 13 responsive to a requirement of an app 19. In a step 406, at a particular fixed interval of time ("sample time interval") for example five (5) minutes, a partition of accelerometer measurements is collected over another particular time interval ("accelerometer time interval"), for example one (1) minute. Alternatively, accelerometer measurements can be collected substantially continuously such that the partition of accelerometer measurements extends the duration of the sample time interval. The partition of accelerometer measurements is fed into the motion classifier 50 by the control agent 13 which produces a result defining a predicted velocity of the mobile device over the accelerometer time interval. In the case where the accelerometer time interval and the sample time interval follow sequentially in series (i.e., the accelerometer time interval starts when the sample time interval ends), in the step 410 the predicted velocity is multiplied by the sum of the accelerometer time interval and the sample time interval to determine a predicted distance traveled over the intervals, and this determined predicted distance is added to the total predicted distance determined subsequent to any zeroing occurring in step 402 to determine the total predicted distance since the last locate. Alternatively, if the sample time interval and the acceleration time interval run at the same time in parallel (i.e., the sample time interval restarts when a new acceleration time interval begins), the predicted velocity is multiplied by the sample time interval to determine the predicted distance traveled over the sample time interval, and this determined predicted distance is added to the total predicted distance determined subsequent to any zeroing occurring in step 402 to determine the total predicted distance since the last locate. As indicated above, map and date/time data are used to condition classifier results and development of the classifier model. Accordingly, in addition to acceleration, the velocity predicted by the classifier 50 and the resulting determined distance traveled can be further based on the location of the mobile device 12 with respect to roads or other geographic features, the time of day, day of week, or day of year.

Figure 4:
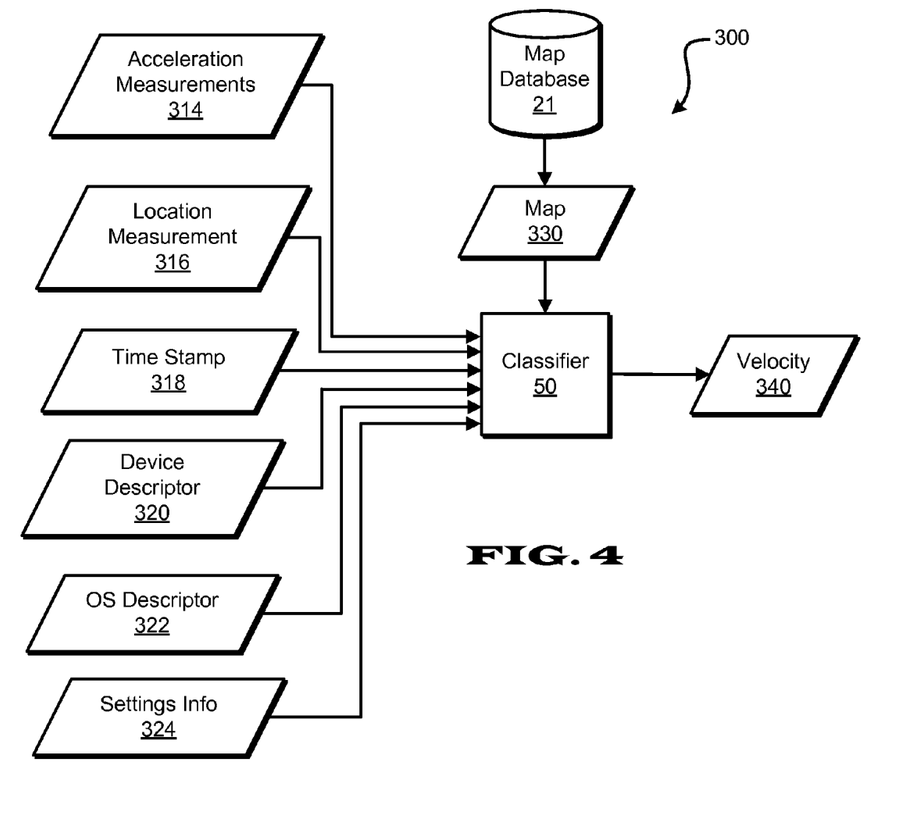
FIG. 4 is a process diagram showing inputs to and output from a motion classifier.

FIG. 4 shows a classifier process diagram 400 showing example inputs to and output from the classifier 50 corresponding to step 408 of the method 200. Acceleration measurements 314, time stamp 318, device descriptor 320 such as device model number and serial number, mobile device operating system descriptor 322, and mobile device settings information 324 are input into the classifier 50. Further, recent mobile device location measurements 316 and corresponding map data 330 from the map database 21 can be input if the classifier 50 is trained to account for geographic features in generating results. The classifier 50 outputs velocity data 340 used in determining a predicted distance.

It is determined in step 412 whether the total predicted distance exceeds a particular threshold ("Distance Traveled Threshold"). If the particular threshold is not exceeded the process returns to step 406 to collect an additional partition of acceleration measurements and calculate a new total predicted distance. When it is determined in step 412 that the total predicted distance determined in step 410 exceeds the particular threshold, a new location request to the LDS 15 is executed (step 414) producing a new measured location (e.g., a GPS locate).

Further, a distance ("measured distance") between the new measured location and the immediately prior measured location is determined (step 416). It is determined if the difference between the predicted distance and the measured distance ("DistΔ") exceeds a particular threshold ("DistΔ Threshold"). If so, the classifier is retrained based on the input data to the classifier 50 (step 420). For example, if the motion classifier 50 is a decision tree classifier, the decision nodes on the tree can be modified to account for the new data. In step 422 the predicted distance is set to zero (0), and then the process returns to step 406 where an additional partition of acceleration measurements is collected after the end of the current sample time interval, which measurements are used to determine new velocity and distance predictions, as described above.

Retraining of a classifier can be performed by the classifier manager 20 via the training engine 34 or by the control agent 13. Retraining can occur on the mobile device 12, or the mobile device can download a new classifier, which has been trained outside of the phone on a training server, for example a server executing the classifier manager 20 with the training engine 34. Optionally, accelerometer data that is tagged with velocity, which has been collected by the mobile device 12, can be sent to a training server, where a classifier model created on the training server can incorporate this new data. If map and date/time data are used in training of the classifier, such inputs can be used in the classifier retraining process insofar as they improve the accuracy of the resulting model.

Further responsive to the difference between the predicted distance and the measured distance ("DistΔ") exceeding the DistΔ Threshold, the Distance Traveled Threshold can be decreased by a particular value, say 1-10%, causing more frequent location measurements thus improving ground truth validation and the motion classifier 50 retraining process. Alternatively, if the DistΔ is below a particular threshold, the DistΔ Threshold can be increased by a particular value, say 1-10%, resulting in less frequent location measurements and a conservation of power and processing resources on the mobile device 12.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for initiating radio signal measurements to determine mobile device location, the method comprising:
   determining a plurality of locations of at least one mobile device based on radio signal measurements initiated during a first time period;

determining acceleration of the at least one mobile device at least between the plurality of locations based on sensor measurements performed during the first time period;
determining at least one time interval between the plurality of locations of the at least one mobile device based on time stamps corresponding to the radio signal measurements initiated during the first time period;
initiating radio signal measurements by a particular mobile device during a second time period;
determining a first location of the particular mobile device based on the radio signal measurements by the particular mobile device initiated during the second time period;
measuring acceleration by the particular mobile device during the second time period;
determining when to initiate radio signal measurements by the particular mobile device to determine a second location of the particular mobile device based at least on the measured acceleration of the particular mobile device during the second time period, the determined plurality of locations of the at least one mobile device based on measurements initiated during the first time period, the at least one time interval between the plurality of locations of the at least one mobile device, and the determined acceleration of the at least one mobile device based on the sensor measurements performed during the first time period; and
initiating radio signal measurements by the particular mobile device during the second time period to determine the second location of the particular mobile device.

2. The method of claim 1, wherein the radio signal measurements comprise global positioning system (GPS) measurements.

3. The method of claim 1, wherein the at least one mobile device comprises a first mobile device, and the particular mobile device comprises a second mobile device.

4. The method of claim 1, wherein the at least one mobile device comprises the particular mobile device.

5. The method of claim 1, further comprising:
training a classifier based at least on the plurality of locations, the at least one time interval, and the determined acceleration of the at least one mobile device; and
applying the classifier to the acceleration measured by the particular mobile device to determine when to initiate radio signal measurements to determine the second location of the particular mobile device.

6. The method of claim 5, further comprising:
determining at least one distance between the plurality of locations of the at least one mobile device; and
training the classifier further based on the at least one distance between the plurality of locations.

7. The method of claim 5, further comprising:
determining at least one time interval between the plurality of locations of the at least one mobile device; and
training the classifier further based on the at least one time interval.

8. The method of claim 5, further comprising training the classifier further based on at least one of a time of the day, a day of the week, or a date of the year corresponding to at least one of the plurality of locations.

9. The method of claim 1, further comprising:
determining at least one distance between the plurality of locations of the at least one mobile device;

determining at least one velocity between the plurality of locations of the at least one mobile device based on the at least one time interval and the at least one distance; and
determining when to initiate radio signal measurements by the particular mobile device further based on the at least one velocity between the plurality of locations of the at least one mobile device.

10. The method of claim 1, further comprising:
comparing the first location of the particular mobile device with a map of a geographic area comprising geographic features; and
determining when to initiate the radio signal measurements further based on the location of the particular mobile device with respect to at least one geographic feature of the geographic area.

11. The method of claim 10, wherein the at least one geographic feature comprises a road, wherein it is determined when to initiate the radio signal measurements to determine the second location of the particular mobile device further based on the particular mobile device being on the road.

12. The method of claim 1, further comprising:
training a classifier based at least on the plurality of locations, the at least one time interval, and the determined acceleration of the at least one mobile device;
applying the classifier to the acceleration measured by the particular mobile device to predict at least one of a velocity of or distance traveled by the particular mobile device; and
determining when to initiate the radio signal measurements by the particular mobile device based at least on the at least one of the predicted velocity of or predicted distance traveled by the particular mobile device to determine the second location of the particular mobile device.

13. The method of claim 1, further comprising:
detecting a change in location of at least one wireless base station relative to the particular mobile device; and
determining when to initiate radio signal measurements by the particular mobile device to determine a second location further based on the detected change in location of the at least one wireless base station relative to the particular mobile device.

14. The method of claim 1, further comprising:
receiving a first device descriptor corresponding to the at least one mobile device;
receiving a second device descriptor corresponding to the particular mobile device; and
determining when to initiate the radio signal measurements further based on first device descriptor and the second device descriptor.

15. The method of claim 1, further comprising:
receiving first device setting information corresponding to the at least one mobile device;
receiving second device setting information corresponding to the particular mobile device; and
determining when ID initiate the radio signal measurements further based on the first device setting information and the second device setting information.

16. A method for initiating radio signal measurements to determine mobile device location, the method comprising:
determining a plurality of locations of at least one mobile device based on radio signal measurements;
determining acceleration of the at least one mobile device at least between the plurality of locations based on sensor measurements;

training a classifier by a network-connectable computing system based on data received from the at least one mobile device, the data comprising the determined plurality of locations and the determined acceleration of the at least one mobile device;

transmitting the classifier to the particular mobile device; and determining a first location of a particular mobile device;

measuring acceleration by the particular mobile device;

applying the classifier by the particular mobile device by at least one processor to the acceleration measured by the particular mobile device to determine when to initiate radio signal measurements to determine the second location of the particular mobile device; and initiating radio signal measurements by the particular mobile device to determine the second location of the particular mobile device.

17. A method for initiating radio signal measurements to determine mobile device location, the method comprising:

determining a plurality of locations of at least one mobile device based on radio signal measurements;

comparing at least one of the plurality of locations with a map of a geographic area comprising geographic features;

determining acceleration, of the at least one mobile device at least between the plurality of locations based on sensor measurements;

training a classifier based at least on the plurality of locations, the determined acceleration of the at least one mobile device, and the comparison;

determining a first location of a particular mobile device;

measuring acceleration by the particular mobile device;

applying the classifier to the acceleration measured by the particular mobile device to determine when to initiate radio signal measurements to determine the second location of the particular mobile device; and initiating radio signal measurements by the particular mobile device to determine the second location of the particular mobile device.

18. A method for initiating radio signal measurements to determine mobile device location, the method comprising:

determining a plurality of locations of at least one mobile device based on radio signal measurements;

determining acceleration of the at least one mobile device at least between the plurality of locations based on sensor measurements;

determining a first location of a particular mobile device;

comparing the first location of the particular mobile device with a map of a geographic area comprising geographic features;

predicting a level of vehicle traffic on the road for a current time;

measuring acceleration by the particular mobile device;

determining when to initiate radio signal measurements by the particular mobile device to determine a second location of the particular mobile device based at least on the measured acceleration of the particular mobile device, the determined plurality of locations of the at least one mobile device, the determined acceleration of the at least one mobile device, the location of the particular mobile device with respect to at least one geographic feature of the geographic area, the at least one geographic feature comprising a road, and based on the particular mobile device being on the road and the predicted level of vehicle traffic on the road; and initiating radio signal measurements by the particular mobile device to determine the second location of the particular mobile device.

19. A method for initiating radio signal measurements to determine mobile device location, the method comprising:

determining a plurality of locations of at least one mobile device based on radio signal measurement;

determining acceleration of the at least one mobile device at least between the plurality of locations based on sensor measurements;

determining a first location of a particular mobile device;

measuring acceleration by the particular mobile device;

predicting a velocity of the particular mobile device based at least on the acceleration of the particular mobile device, the determined plurality of locations of the at least one mobile device, and the determined acceleration of the at least one mobile device; and determining when to initiate radio signal measurements by the particular mobile device to determine a second location of the particular mobile device based at least on the predicted velocity of the particular mobile device; and initiating radio signal measurements by the particular mobile device to determine the second location of the particular mobile device.

20. The method of claim 19, further comprising:

determining a confidence level of the predicted velocity; and determining when to initiate radio signal measurements by the particular mobile device further based at least on the determined confidence level.

21. The method of claim 19, further comprising:

predicting a distance traveled by the particular mobile device based on the predicted velocity; and determining when to initiate radio signal measurements by the particular mobile device further based on the predicted distance traveled by the particular mobile device.

22. The method of claim 21, further comprising initiating radio signal measurements by the particular mobile device to determine a second location of the particular mobile device responsive to the predicted distance exceeding a particular threshold.

23. A method for initiating radio signal measurements to determine mobile device location, the method comprising:

determining a plurality of locations of at least one mobile device based on radio signal measurements;

determining acceleration of the at least one mobile device at least between the plurality of locations based on sensor measurements;

training a classifier based at least on the plurality of locations and the determined acceleration of the at least one mobile device;

determining a first location of a particular mobile device;

measuring acceleration by the particular mobile device;

applying the classifier to the acceleration measured by the particular mobile device to predict at least one of a velocity of or distance traveled by the particular mobile device;

determining when to initiate radio signal measurements by the particular mobile device to determine a second location of the particular mobile device based at least on the at least one of the predicted velocity of or predicted distance traveled by the particular mobile device to determine the second location of the particular mobile device;

initiating radio signal measurements by the particular mobile device to determine the second location of the particular mobile device;

determining a distance traveled by the particular mobile device based on the first location and the second location of the particular mobile device;

comparing the determined distance traveled by the particular mobile device with the predicted distance traveled by the particular mobile device; and retraining the classifier based at least on the comparison of the determined distance and the predicted distance.

24. The method of claim 23, wherein retraining the classifier comprises adjusting a velocity result of the classifier based at least on the determined distance.

25. The method of claim 23, wherein the classifier is retrained further based on at least one of a geographic feature, a time of the day, a day of the week, or a date of the year corresponding to at least one of the first location or the second location of the particular mobile device.

26. A method for initiating radio signal measurements to determine mobile device location, the method comprising:

determining a plurality of locations of at least one mobile device based on radio signal measurements;

determining acceleration of the at least one mobile device at least between the plurality of locations based on sensor measurements;

training a classifier based at least on the plurality of locations and the determined acceleration of the at least one mobile device;

determining a first location of a particular mobile device;

measuring acceleration the particular mobile device;

applying the classifier to the acceleration measured by the particular mobile device to predict at least one of a velocity of or distance traveled by the particular mobile device;

determining when to initiate radio signal measurements by the particular mobile device to determine a second location of the particular mobile device based on the predicted distance exceeding a predetermined threshold;

initiating radio signal measurements by the particular mobile device to determine the second location of the particular mobile device.

27. The method of claim 26, further comprising:

determining a distance traveled by the particular mobile device based on the first location and the second location of the particular mobile device;

comparing the determined distance traveled by the particular mobile device with the predicted distance traveled by the particular mobile device; and adjusting the predetermined threshold based on the comparison of the determined distance and the predicted distance.

28. The method of claim 26, further comprising measuring additional acceleration by the particular mobile device;

applying the classifier to the additional acceleration measured by the particular mobile device to predict an additional distance traveled by the particular mobile device;

determining to initiate additional radio signal measurements by the particular mobile device further based on the predicted additional distance traveled by the particular mobile device exceeding the adjusted threshold; and initiating the additional radio signal measurements by the particular mobile device to determine a third location of the particular mobile device.

29. A method for initiating radio signal measurements to determine mobile device location, the method comprising:

initiating radio signal measurements by a mobile device during a first time period and determining a plurality of locations of the mobile device based on the radio signal measurements initiated during the first time period;

determining at least one time interval between the plurality of locations of the mobile device based on the radio signal measurements initiated during the first time period;

performing acceleration measurements by the mobile device during the first time period and determining acceleration of the mobile device at least between the plurality of locations based on the acceleration measurements performed during the first time period;

initiating radio signal measurements by the mobile device during a second time period and determining a first location of the mobile device corresponding to the second time period based on the radio signal measurements initiated during the second time period;

performing acceleration measurements by the mobile device during the second time period and determining acceleration of the mobile device based on the acceleration measurements by the mobile device performed during the second time period;

determining when to initiate radio signal measurements by the particular mobile device to determine a second location of the particular mobile device based at least on the measured acceleration during the second time period, the determined plurality of locations during the first time period, the at least one time interval between the plurality of locations during the first time period, and the determined acceleration during the first time period; and initiating radio signal measurements by the particular mobile device to determine the second location of the particular mobile device.

30. The method of claim 29, further comprising providing an application to the mobile device, the application via one or more processors of the mobile device enabling:

the determining of when to initiate the radio signal measurements;

the initiating of the radio signal measurements; and the performing of the acceleration measurements.

31. The method of claim 29, initiating the radio signal measurements comprising initiating GPS location requests via GPS hardware on the mobile device.

32. The method of claim 29, further comprising performing the acceleration measurements via an accelerometer on the mobile device.

33. The method of claim 29, further comprising:

comparing at least one of the plurality of locations with a map of a geographic area comprising geographic features; and determining when to initiate radio signal measurements by the particular mobile device to determine a second location further based on the comparison.

34. The method of claim 29, further comprising:

comparing the first location with a map of a geographic area comprising geographic features; and determining when to initiate radio signal measurements by the particular mobile device to determine a second location further based on the comparison.

35. The method of claim 29, further comprising:
training a classifier based at least on the plurality of locations, the at least one time interval, and the acceleration measured by the mobile device during the first time period; and
applying the classifier to the acceleration measured by the mobile device during the second time period to determine when to initiate radio signal measurements to determine the second location of the particular mobile device.

36. The method of claim 35, further comprising:
comparing at least one of the plurality of locations with a map of a geographic area comprising geographic features; and
training the classifier further based on the comparison.

37. A mobile device comprising at least one non-transitory computer readable storage medium, at least one processor, an acceleration sensor, and radio signal measurement hardware, the computer readable storage medium having encoded thereon instructions that, when executed by the at least one processor of the device, cause the device to perform a process comprising:
initiating radio signal measurements during a first time period and determining a plurality of locations of the mobile device based on the radio signal measurements initiated during the first time period;
determining at least one time interval between the plurality of locations of the mobile device based on the radio signal measurements initiated during the first time period;
performing acceleration measurements by the acceleration sensor during the first time period and determining acceleration of the mobile device at least between the plurality of locations based on the acceleration measurements performed during the first time period;
initiating radio signal measurements during a second time period and determining a first location of the mobile device corresponding to the second time period based on the radio signal measurements initiated during the second time period;
performing acceleration measurements by the acceleration sensor during the second time period and determining acceleration of the mobile device based on the acceleration measurements by the mobile device performed during the second time period;
determining when to initiate radio signal measurements to determine a second location of the particular mobile device based at least on the measured acceleration during the second time period, the determined plurality of locations during the first time period, the at least one time interval between the plurality of locations during the first time period, and the determined acceleration during the first time period; and
initiating radio signal measurements to determine the second location of the particular mobile device.

* * * * *

UNITED STATES PATENT AND TRADEMARK OFFICE
CERTIFICATE OF CORRECTION

PATENT NO. : 9,510,152 B2
APPLICATION NO. : 14/250777
DATED : November 29, 2016
INVENTOR(S) : Weiss et al.

It is certified that error appears in the above-identified patent and that said Letters Patent is hereby corrected as shown below:

On the Title Page

For the listing of Attorney, Agent, or firm, delete "Dova Law, P.C." and insert therefore --Dovas Law, P.C.--.

In the Claims

At Claim 15, At Column 8 Line 58, delete "ID" and insert therefore --to--.

At Claim 19, At Column 10 Line 7, delete "measurement" and insert therefore --measurements--.

Signed and Sealed this
Twenty-eighth Day of February, 2017

Michelle K. Lee
*Director of the United States Patent and Trademark Office*